(12) United States Patent
Kodama

(10) Patent No.: US 6,324,005 B1
(45) Date of Patent: Nov. 27, 2001

(54) FOCUSING OPTICAL SYSTEM

(75) Inventor: Kenichi Kodama, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/464,085

(22) Filed: Dec. 16, 1999

(30) Foreign Application Priority Data

Dec. 17, 1998 (JP) .................................................. 10-359292

(51) Int. Cl.⁷ ...................................................... G02B 5/02
(52) U.S. Cl. ............................ 359/599; 359/618; 355/52
(58) Field of Search .................... 359/599, 707, 359/618–625; 342/238–254; 362/12, 26, 31; 356/394, 237; 355/52, 55

(56) References Cited

U.S. PATENT DOCUMENTS

| | | | |
|---|---|---|---|
| 4,309,093 | * 1/1982 | Kuwayama et al. | 396/373 |
| 5,471,327 | * 11/1995 | Tedesco et al. | 359/15 |
| 5,694,237 | * 12/1997 | Melville | 359/214 |
| 5,729,382 | * 3/1998 | Morita et al. | 359/376 |
| 5,774,222 | * 6/1998 | Maeda et al. | 356/394 |
| 5,959,654 | * 9/1999 | Yoshida | 347/238 |
| 6,002,520 | * 12/1999 | Hoch et al. | 359/565 |
| 6,185,016 | * 2/2000 | Popovich | 359/15 |

FOREIGN PATENT DOCUMENTS 10-181090    7/1998   (JP) .

OTHER PUBLICATIONS

English Abstract of Japanese Reference No. 10–181090.

* cited by examiner

*Primary Examiner*—Thong Nguyen
(74) *Attorney, Agent, or Firm*—Sughrue, Mion, Zinn, Macpeak & Seas, PLLC

(57) ABSTRACT

A focusing optical system is provided which prevents unevenness in a distribution of an amount of light caused by positional offset of a light source, and which can focus with high precision. A diffraction grating and a focusing lens are provided in a casing of the focusing optical system. Due to the diffraction grating, each of focused spots on a photosensitive material are focused at a magnification which is greater than a focusing magnification determined by the focusing lens. Even if a light beam is offset in a subscanning direction, unevenness in the distribution of the amount of light can be reduced and highly precise focusing can be achieved.

20 Claims, 12 Drawing Sheets

FOCUSING OPTICAL SYSTEM

BACKGROUND OF THE INVENTION

1. Field of the Invention

The present invention relates to a focusing optical system in which light is emitted from plural light sources in accordance with image information and which focuses light.

2. Description of the Related Art

Currently, there are image exposing devices in which plural light sources, which are disposed in a matrix-like arrangement at a predetermined position of the device, and a photosensitive material are moved relatively in a main scanning direction and a subscanning direction such that the photosensitive material is exposed. The light from the plural light sources is focused onto the photosensitive material by a focusing optical system. For example, semiconductor elements such as LEDs are used as the light sources, and these semiconductor elements are arranged in a matrix-like arrangement at a predetermined pitch.

However, in actuality, there are cases in which the light sources are not disposed at a predetermined pitch. Namely, there are cases in which positional offset (so-called pitch offset) occurs between the desired arrangement of positions of the light sources and the actual arrangement of positions. Due to this pitch offset, the distribution of the amount of light at the time of scanning the light sources and the photosensitive material relatively may be uneven and the image quality may deteriorate.

In order to reduce the unevenness in the distribution of the amount of light due to pitch offset, for example, reducing the focusing magnification of the lens forming the focusing optical system has been considered. Namely, by reducing the focusing magnification, the absolute amount of the pitch offset on the photosensitive material is reduced. However, if the focusing magnification of the lens is reduced, the spot size on the photosensitive material is also reduced, and even if the absolute amount of the pitch offset is low, the unevenness in the distribution of the amount of light will be great.

SUMMARY OF THE INVENTION

In view of the aforementioned, an object of the present invention is to provide a focusing optical system which can prevent unevenness in the distribution of the amount of light caused by positional offset of the light source, and which can focus with high precision.

A first aspect of the present invention is a focusing optical system, comprising: a plurality of light sources emitting light in accordance with image information; focusing device for focusing light from the plurality of light sources such that intervals between light from the plurality of light sources is at a predetermined focusing magnification with respect to intervals between the plurality of light sources; and spot size enlarging device for focusing focused spots of the plurality of light sources at a spot magnification which is larger than the focusing magnification by the focusing device.

Accordingly, light from the plurality of light sources is focused by the focusing device such that intervals between the light from the plurality of light sources are at a predetermined focusing magnification with respect to intervals between the plurality of light sources.

Each of the focused spots of the plurality of light sources is focused by the spot size enlarging device at a spot magnification which is greater than the focusing magnification. Namely, the spot size at the focused position is greater than a case in which focusing is carried out only by the focusing device. Thus, even if there is offset in the positions (pitch offset) of the plurality of light sources, unevenness in the distribution of the amount of light of the plurality of light sources on the whole is corrected, and as a result, highly precise focusing can be achieved.

In a second aspect of the present invention, in the first aspect, the spot size enlarging device comprises at least one diffraction grating.

In a third aspect of the present invention, in the first aspect, the spot size enlarging device comprises at least one material having a birefringent property.

In a fourth aspect of the present invention, in the first aspect, the spot size enlarging device is at least one lens forming the focusing device and has a predetermined spherical aberration.

The spot size enlarging device may comprise, as in the second aspect, a diffraction grating, or may comprise, as in the third aspect, a material having abirefringent property. In either case, a spot size enlarging device can be provided with a simple structure.

As in the fourth aspect, the spot size enlarging device may be a lens which forms the focusing device and which has a predetermined spherical aberration. In this way, the spot size enlarging device and the focusing device are made integral, and there is no need to provide a separate member such as a diffraction grating or a material having abirefringent property. Thus, the number of parts of the focusing optical system can be reduced, and the focusing optical system can be made light-weight and inexpensive.

In a fifth aspect of the present invention, in the invention of any of the first through fourth aspects, at least one diffusing member, which diffuses the light from the plurality of light sources, is disposed between the plurality of light sources and the focusing device.

Even if there is unevenness in the distribution of the amount of light due to the configuration of the light emitting surfaces of the light sources, the distribution of the amount of light from the light sources is made uniform (what is known as beam shaping) by the diffusing member. Even more highly precise focusing can thereby be realized.

In a sixth aspect of the present invention, in the invention of any of the first through the fifth aspects, the plurality of light sources is formed with at least two types of light sources each of different wavelengths, and the diffusing member has a degree of diffusion corresponding to the different wavelengths of the plurality of light sources.

In a case in which the diffusing member has a single degree of diffusion, the beam configuration of the light diffused by the diffusing member is different for each color. In contrast, by using a diffusing member which has degrees of diffusion corresponding to different wavelengths, the beam configuration of the light diffused by the diffusing member is the same for each of the colors.

In the seventh aspect of the present invention, in the invention of the first to sixth aspects, the plurality of light sources are arranged along a main scanning direction and a subscanning direction, and a spot magnification of the spot size enlarging device is set to be greater in the subscanning direction than in the main scanning direction.

Accordingly, the spot size is large in the subscanning direction, and unevenness in the distribution of the amount of light can be reduced. Because the spot size in the main scanning direction is smaller than in the subscanning direction, a sharper image can be obtained.

In the eighth aspect of the present invention, a focusing optical system comprises: a plurality of light sources emitting light in accordance with image information; focusing device for focusing light from the plurality of light sources such that intervals between light from the plurality of light sources is at a predetermined focusing magnification with respect to intervals between the plurality of light sources; and diffusing device provided at one of a pupil position of the focusing device or a vicinity thereof, for diffusing light from the plurality of light sources.

Accordingly, the intervals between the light from the plurality of light sources is focused by the focusing device at a predetermined focusing magnification with respect to the intervals between the light sources, respectively.

Further, the respective focused spot of each of the plurality of light sources is diffused by the diffusing device, which is disposed at the pupil position of the focusing device or vicinity thereof. Namely, the spot size at the focusing position is larger than in the case in which focusing is carried out simply by the focusing device alone. As a result, even if positional offset of the plurality of light sources (what is known as pitch offset) is generated, unevenness in the distribution of the amount of light of the entirety of the plurality of light sources is corrected. Focusing can thereby be carried out with a high degree of accuracy.

Further, even in cases in which non-uniformity in the distribution of the amount of light occurs due to the configuration of the light-emitting surface of the light sources, the diffusing device diffuses the light from the light sources, and the distribution of the amount of light is thereby made uniform (what is known as beam shaping). As a result, focusing can carried out with a high degree of accuracy.

Further, the diffusing device carries out functions as device for making the spot magnification larger than the focusing magnification and device for beam shaping. Therefore, compared with a case in which each of these device are provided separately, the number of components is reduced, which lowers weight and costs.

In the ninth aspect of the present invention, in the eighth aspect, the diffusing device has a different degree of diffusion in two directions orthogonal to an optical axis from the plurality of light sources.

In this way, by using the diffusing device which has a different degree of diffusion in two directions orthogonal to an optical axis, desired spot magnification and desired beam shaping can be obtained in accordance with the direction. Accordingly, a sharper image can be obtained. For example, as in the tenth aspect of the invention, the plurality of light sources can be arranged along the main scanning direction and the subscanning direction, and the degree of diffusion of the diffusing device can be set to be larger in the subscanning direction than in the main scanning direction. As a result, the spot size becomes larger in the subscanning direction than in the main scanning direction, and unevenness in the distribution of the light amount can be reduced. Further, since the spot size is smaller in the main scanning direction than in the subscanning direction, a sharper image can be obtained.

In the eleventh aspect of the present invention, in any of the eighth to tenth aspects, the diffusing device is movable in the optical axis direction from the plurality of light sources towards the diffusing device.

In this way, by moving the diffusing device along the optical axis direction, the spot magnification also changes, and so the focusing beam of the focused light can be made to have a desired diameter. As a result, unevenness in the distribution of the light amount, which originates in pitch offset of the plurality of light sources, can be effectively corrected, and focusing can be carried out more accurately.

In the twelfth aspect of the present invention, in any of the eighth to the eleventh aspects, the diffusing device comprises a plurality of diffusing plates disposed at the pupil position or the vicinity thereof such that the plurality of diffusing plates are returnable.

Accordingly, by moving the plurality of the diffusing plates to and from the pupil position or vicinity thereof, the number of diffusing plates at the pupil position or vicinity thereof can be changed, and the degree of diffusion of the diffusing device as a whole can be changed. Thus, the spot magnification also changes, and the focusing beam diameter of the focused light can be thereby made to be a predetermined diameter. As a result, unevenness in the distribution of the light amount, which originates in pitch offset of the plurality of light sources, can be effectively corrected, and focusing can be carried out more accurately.

In the thirteenth aspect of the present invention, in any of the eighth to the twelfth aspects, the diffusing device is rotatable at the pupil position or the vicinity thereof.

In this way, by rotating the diffusing device, the spot magnification changes, and so the focusing beam diameter of the focused light can be made to be a predetermined diameter. As a result, unevenness in the distribution of the light amount, which originates in pitch offset of the plurality of light sources, can be effectively corrected, and focusing can be carried out more accurately.

In the fourteenth aspect of the present invention, in any of the eighth to the thirteenth aspects, the diffusing device is formed with a material having a changeable degree of diffusion.

In this way, by forming the diffusing device with a material having a changeable degree of diffusion, the spot magnification can be changed by changing the degree of diffusion. As a result, unevenness in the distribution of the light amount, which originates in pitch offset of the plurality of light sources, can be effectively corrected, and focusing can be carried out more accurately. The material to be used as the material having a changeable degree of diffusion is not particularly limited. However, as in the fifteenth aspect of the present invention, a liquid crystal having light scattering properties, whose scattering degree changed due to applied voltage, can be listed as an example. As a result, the degree of diffusion can be changed in a simple structure, simply by changing the applied voltage.

In the sixteenth aspect of the present invention, in any of the first to the fifteenth aspects, at least one slit plate in which light-pass-through holes corresponding to the light from the plurality of light sources are formed, is disposed between the plurality of light sources and the focusing device.

Generally, transmitting holes of a slit can be formed (i.e., the positions and configurations thereof can be formed) with a precision which is much higher than the precision of mounting light sources to a member for mounting such as a substrate or the like. Accordingly, even if the positions of the plural light sources are offset from the desired positions, this offset can be corrected by the transmitting holes. Thus, even more highly precise focusing can be achieved.

The intervals between the transmitting holes are not particularly limited. For example, in a case in which the light sources are aligned in the subscanning direction, the transmitting holes may be formed at equal intervals.

In consideration of the aberration of the focusing device (e.g., the distortion aberration of a lens in a case in which a lens is used as the focusing device), the intervals between the transmitting holes may be adjusted in advance. Further, in consideration of the photosensitive surface of the photosensitive material, the intervals between the transmitting holes may be adjusted in advance.

In the seventeenth aspect of the present invention, in the sixteenth aspect, auxiliary light-pass-through holes are formed in the slit plate, at positions corresponding to positions of outer sides of light sources which are provided at both end portions of the plurality of light sources in the direction in which the plurality of light sources are aligned.

A portion of the light from the plurality of light sources reaches the photosensitive material from the auxiliary light-pass-through holes via the focusing device and the spot size enlarging device. At the light sources at the both end portions as well, in the same way as the central light sources, light can pass through the corresponding transmitting hole and through the transmitting holes adjacent thereto at the both sides thereof. Thus, unevenness in the distribution of the amount of light can be reduced.

In the eighteenth aspect of the present invention, in the seventeenth aspect, dummy light sources are provided at positions corresponding to positions of the auxiliary light-pass-through holes.

Considering the light from a particular light source among the plural light sources, generally, this light is affected by the other light sources. (For example, in the case in which LEDs are used as the fight sources, a portion of the light from a given LED passes through other LEDs or is reflected by other LEDs, and is then incident on the focusing device and the spot size enlarging device). Accordingly, by providing the auxiliary light-pass-through holes and the dummy light sources, both light from the light sources at the light source alignment direction central portion and light from the light sources at the ends in the light source alignment direction can pass through or be reflected by other LEDs. Thus, uniform spots can be obtained on the photosensitive material.

A nineteenth aspect of the present invention is a focusing optical system, comprising: at least two light sources which emit light in accordance with image information; focusing device for focusing light emitted from the at least two light sources based on a predetermined focusing magnification on a photosensitive material; and magnification enlarging device for setting a magnification based on an interval between lights emitted from the at least two light sources and focused on the photosensitive material to be larger than the predetermined focusing magnification.

DESCRIPTION OF THE PREFERRED EMBODIMENTS

Figure 1:
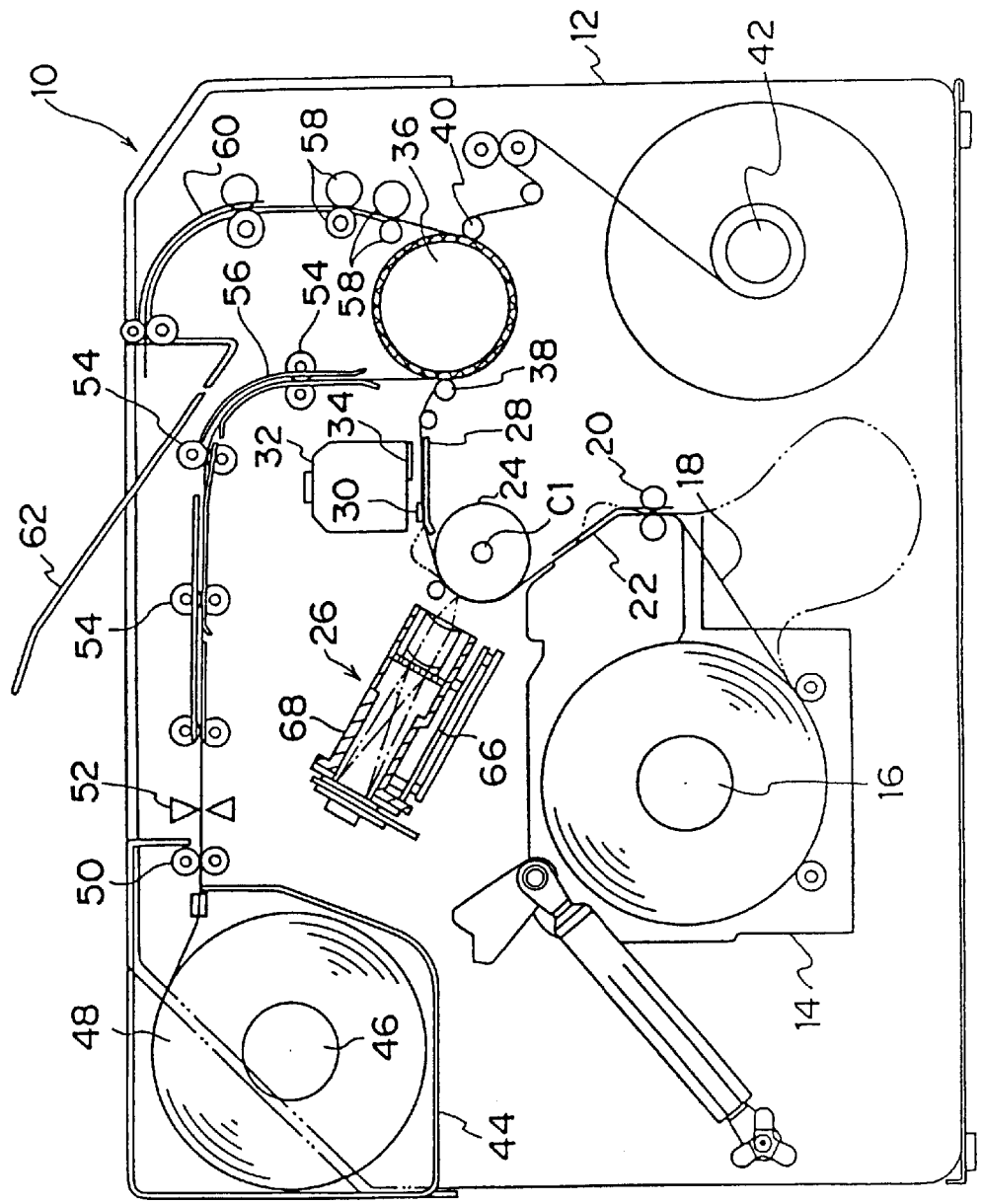
FIG. 1 is a schematic structural view illustrating an image forming device which employs an exposure head having a focusing optical system relating to an embodiment of the present invention.
Figure 2:
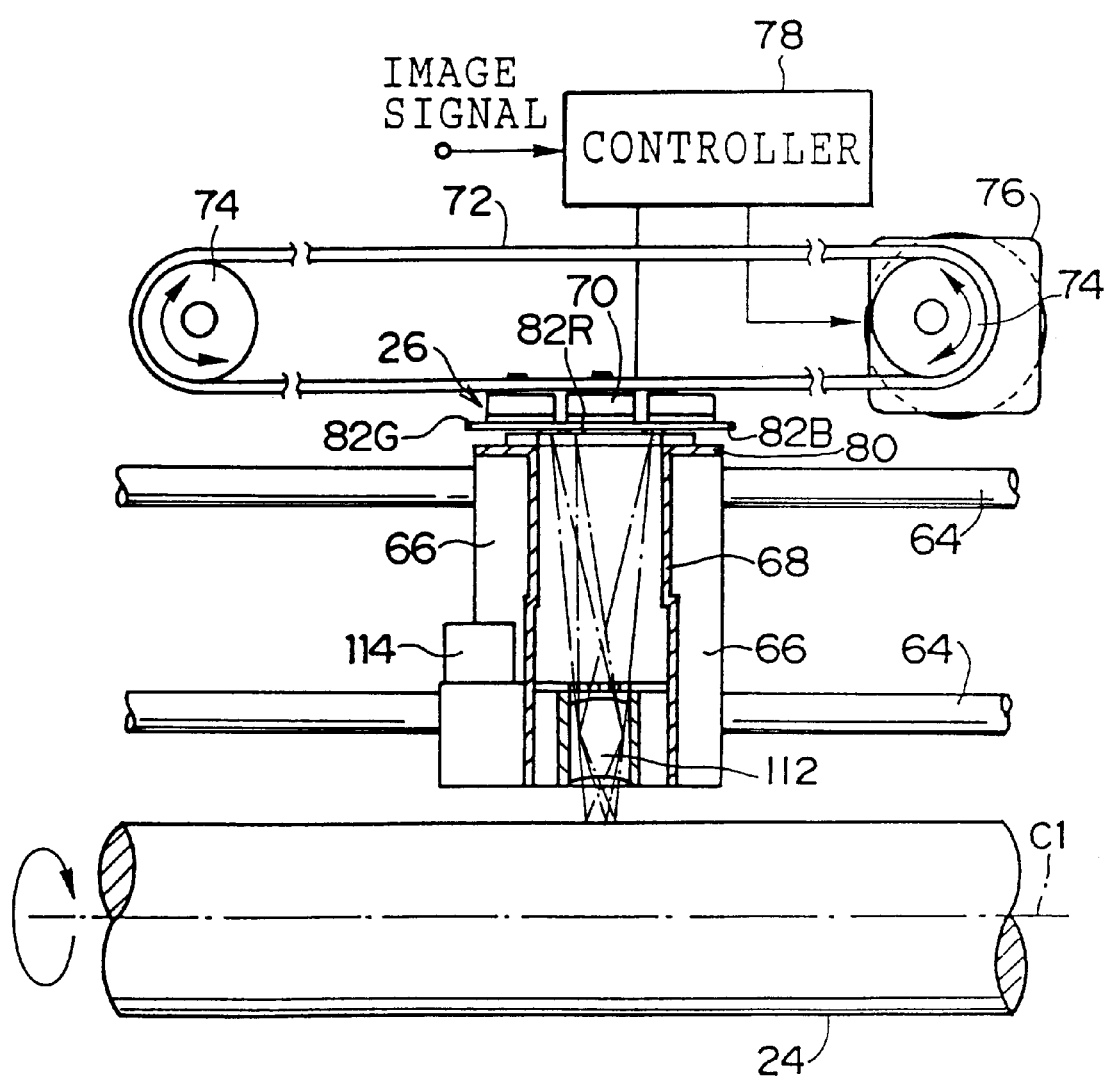
FIG. 2 is a schematic structural view of the exposure head having the focusing optical system relating to the embodiment of the present invention.

FIG. 2 illustrates an exposure section of an image forming device to which is applied a focusing optical system relating to an embodiment of the present invention. FIG. 1 illustrates the schematic structure of an image forming device 10.

As illustrated in FIG. 1, a photosensitive material magazine 14 is disposed within a housing 12 of the image forming device 10. A supply reel 16 is rotatably and removably attached to the photosensitive magazine 14. A photosensitive material 18 is set within the supply reel 16 in a wound state. Due to the supply reel 16 rotating due to a driving device (not shown), the photosensitive material 18 is fed out.

The leading end of the photosensitive material 18 is nipped by pull-out rollers 20 provided at a vicinity of the discharge opening of the photosensitive magazine 14. The pull-out rollers 20 pull the photosensitive material 18 out under predetermined conditions, and feed the photosensitive material 18 to a guide plate 22, and form a buffer of the photosensitive material 18 (i.e., a slack portion of the photosensitive material 18, illustrated by the two-dot chain line).

The photosensitive material 18 which has passed by the guide plate 22 is trained around an exposure drum 24, and an image is exposed by an exposure head 26. The photosensitive drum 24 is cylindrical, and the exposure surface (outer peripheral surface) thereof has a constant curvature around rotation shaft C1. By effecting exposure with the photosensitive material 18 trained around the photosensitive drum 24, a constant flatness of the photosensitive material 18 can be ensured, without wrinkles or the like forming in the transverse direction of the photosensitive material 18.

The photosensitive material 18 on which an image has been exposed is nipped by a support stand 28 and a pressure plate 30, and is fed beneath an application tank 32. An application member 34, which is formed of a material having high absorbency such as a sponge or the like, is provided at the application tank 32. Water is applied to the photosensitive material 18 by the application member 34.

The photosensitive material 18 to which water has been applied is trained around a heater drum 36, in which is provided a heat generating device such as a halogen lamp, at a constant pressure by tension rollers 38, 40. While the trained photosensitive material 18 is heated, it is superposed with an image receiving paper 48 which will be described later, such that the image is transferred onto the image receiving paper 48.

The photosensitive material 18, whose image has been transferred onto the image receiving paper 48, is taken-up onto a discard reel 42. Because the photosensitive material 18 is transferred from the supply reel 16 to the discard reel 42 without being cut, the photosensitive material 18 itself functions as a belt which applies constant pressure to the image receiving paper 48.

An image receiving paper magazine 44 is provided within the housing 12 above the photosensitive material magazine 14. A supply reel 46 is rotatably and removably attached to the image receiving paper magazine. The image receiving paper 48 is set within the supply reel 46 in a wound state. After the image receiving paper 48 is pulled out by nip rollers 50, the image receiving paper 48 is cut to a predetermined length by a cutter 52, and thereafter, is guided by conveying rollers 54 and a guide plate 56, is superposed with the photosensitive material 18, and is trained about the heat drum 36. The image receiving paper 48 onto which the image has been transferred from the photosensitive material 18 is peeled off of the heat drum 36 by a peeling claw (not shown), and is guided onto a tray 62 by conveying rollers 58 and a guide plate 60.

As illustrated in FIG. 2, above the exposure drum 24, two shafts 64 are disposed so as to be parallel to the rotation shaft Cl. The shafts 64 pass through through holes formed in a support block 66 such that the support block 66 can slide along the shafts 64.

A casing 68 of the exposure head 26 is fixed to the support block 66. A connecting plate 70 is mounted to the casing 68. An endless timing belt 72 is fixed to the connecting plate 70. The ting belt 72 is trained around sprockets 74 provided in vicinities of both ends of the shafts 64. Rotational force from a stepping motor 76 is transmitted to the sprockets 74 via a transmission. The exposure head 26 is moved reciprocally along the shafts 64 due to forward and reverse driving of the stepping motor 76.

The driving of the stepping motor 76 is controlled by a controller 78, and is made synchronous with the movement of the photosensitive material 18. Namely, in a state in which the photosensitive material 18 is moved one step and then stopped, the stepping motor 76 is driven forward, and the exposure head 26 moves in a direction (a forward direction) along the shafts 64, i.e., moves in the transverse direction (main scanning direction) of the photosensitive material 18.

After a predetermined pulse has been confirmed, and in the state in which the photosensitive material is moved one step and then stopped, the stepping motor 76 is driven reversely so that the exposure head 26 moves in the opposite direction (a reverse direction) along the shafts 64, i.e., moves in the transverse direction (main scanning direction) of the photosensitive material 18.

Figure 3:
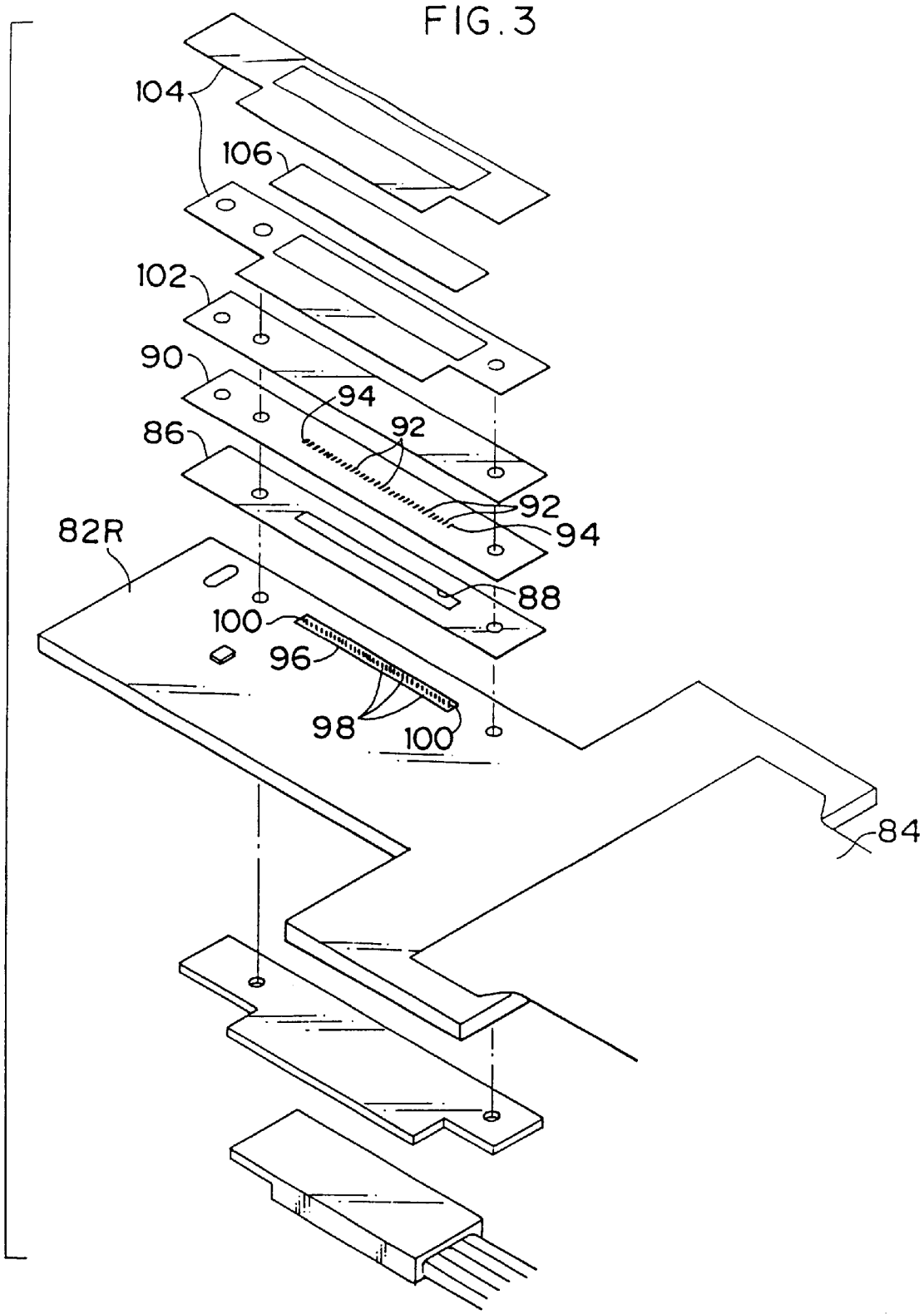
FIG. 3 is an exploded perspective view illustrating a focusing optical system relating to the embodiment of the present invention. embodiment of the present invention.
Figure 4:
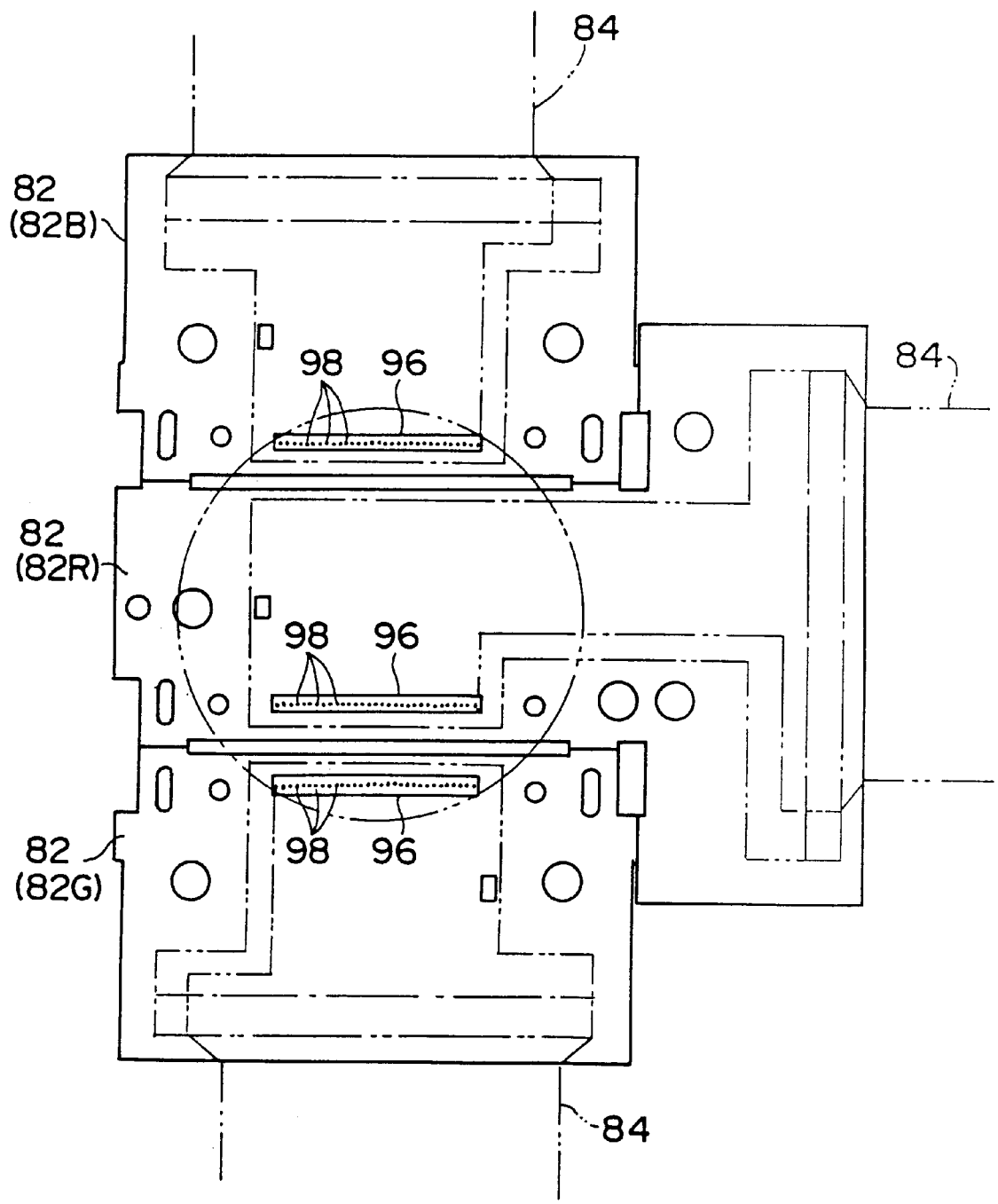
FIG. 4 is a plan view illustrating the substrate of the focusing optical system relating to the embodiment of the present invention.

Substrates 82 (82R, 82B, 82G) corresponding to the three colors of RGB are fixed to a top plate 80 of the casing 68. As illustrated in FIGS. 3 and 4, flexible cables 84 of the controller 78 in which image signals are stored are connected to the substrates 82R, 82G, 82B. An LED chip 96 whose lighting is controlled by signals from the controller 78 is mounted to each of the substrates 82R, 82G, 82B. At each LED chips 96, plural LEDs 98 corresponding to the substrates 82R, 82G or 82B are disposed linearly along the sub scanning direction. (In the present embodiment, there are 31 red LEDs at the substrate 82R, 31 green LEDs at the substrate 82G, and 31 blue LEDs at the substrate 82B.) These LEDs 98 are lit in accordance with image signals. (In FIG. 3, for convenience of illustration, the substrate 82R is illustrated upside-down. Accordingly, in FIG. 3, the light of the LEDs 98 is illuminated upward in the figure.)

The substrate 82R illustrated in FIG. 3 is the substrate to which the R (red) LEDs 98 are mounted, and is formed in a substantial T-shape. In contrast, as illustrated in FIG. 4, the substrates 82G and 82B to which the G (green) and B (blue) LEDs 98 are mounted are formed in substantially rectangular shapes. By disposing the substrate 82R between the substrates 82G, 82B, the flexible cables 84 can extend radially in three different directions. Thus, the flexible cables 84, each having a line width, can be connected to the substrates 82R, 82G, 82B within the same plane and without interfering with each other. Hereinafter, explanation will be given by using the substrate 82R as an example, but the basic structures (the members mounted to the substrates 82 and the like) of the substrates 82G, 82B are the same as that of the substrate 82R.

A protective frame 86 is fixed to the substrate 82R. An accommodating hole 88 corresponding to the LED chip 96 is formed in the protective frame 86. The thickness of the protective frame 86 is greater than a fixed portion (not shown) at which the LED chip 96 and the substrate 82R (controller 78) are connected. (In a case in which the LED chip 96 is fixed to the substrate 82R by bonding, the fixed portion is the portion built-up by the bonding.) Thus, this fixed portion is protected by the protective frame 86.

A slit plate 90 is fixed to the light illuminating side of the protective frame 86. Plural transmitting holes 92 corresponding to the plural LEDs 98 are formed in the slit plate 90. Generally, there is some offset between the positions at which the LEDs 98 are actually mounted to the substrate 82R and the desired mounting positions. However, the precision of forming the transmitting holes 92 in the slit plate 90 (the accuracy of the positions at which the transmitting holes 92 are formed in the slit plate 90 and the accuracy of the configurations of the transmitting holes 92) can be much higher than the precision of mounting the LEDs 98 to the substrate 82R (the accuracy of positions at which the LEDs 98 are mounted to the substrate 82R). Thus, even if there is offset between the positions at which the LEDs 98 are actually mounted to the substrate 82R and the desired mounting positions, the light of the LEDs 98 is emitted via the transmitting holes 92 of the slit plate 90. Therefore, lights (spot lights) of constant spot shapes are always emitted from fixed positions. The region corresponding to the transmitting holes substantially forms a light-emitting region of the LEDs 98.

The number of the transmitting holes 92 may be the same as the number of the LEDs 98, but it is preferable that auxiliary transmitting holes 94 of the same configuration as the transmitting holes 92 are formed at both ends in the direction in which the transmitting holes 92 are aligned (the subscanning direction). Namely, the light from one LED 98 passes not only through the transmitting hole 92 corresponding to that LED 98, but also, a portion of the light passes through the transmitting holes 92 at the vicinity of the corresponding transmitting hole 92 as well. Namely, the light which is emitted from one LED 98 and reaches the photosensitive material 18 is the light which passes through the corresponding transmitting hole 92 and the transmitting holes 92 at the sides thereof. If the auxiliary transmitting holes 94 are not provided, light cannot pass through the alignment direction outer sides of the transmitting holes 92 at the both ends, and thus, the amount of light reaching the photosensitive material 18 at portions corresponding to the vicinities of the alignment direction ends is lower than at the other portions. However, by forming the auxiliary transmitting holes 94, light is transmitted through the auxiliary transmitting holes 94 at the alignment direction outer sides of the transmitting holes 92, and thus, a decrease in the amount of light in the vicinities of the alignment direction ends can be prevented, and an amount of light which is uniform overall can be obtained.

When the auxiliary transmitting holes 94 are formed, it is preferable to provide, at the LED chip 96, dummy light sources 100 which are structured substantially the same as the LEDs 98 but which do not emit light. Namely, the light which is emitted from one LED 98 not only passes directly through the corresponding transmitting hole 92, but also, a portion thereof is reflected by other LEDs 98 (or is transmitted through other LEDs 98), and thereafter, reaches the transmitting hole 92. Accordingly, by providing the dummy light sources 100, even with regard to the light passing through the auxiliary transmitting holes 94 as well, this light is reflected by (or transmitted through) the dummy light sources 100 which are formed substantially similarly to the LEDs 98, and can be set in a state which is the same as a state in which an existing light source (LED 98) were provided at the position of the dummy light source 100. Note that if light can be reflected (or transmitted) in the same way as with the LED 98 which is the existing light source, there is no need for the dummy light source 100 to have the same structure as the LED 98. For example, a semi-transparent mirror of a predetermined configuration or the like may be used.

The interval between the respective transmitting holes 92 and the interval between the transmitting holes 92 and the auxiliary transmitting holes 94 (and the interval between the respective LED 98) can be the same. However, in consideration of the distortion aberration of the focusing lens 112 which will be discussed later, it is preferable that these intervals be intervals which are determined in advance such that the focused spots are aligned at equal intervals on the photosensitive material 18.

Because the exposure drum 24 is curved at a constant curvature in the subscanning direction, the closer to the LED 98 alignment direction, the more the light hits the exposure drum 24 at an angle and the greater the interval between the focused spots. Accordingly, it is preferable to take the curvature of the exposure drum 24 into consideration as well, and to adjust the interval between the respective transmitting holes 92 and the interval between the transmitting holes 92 and the auxiliary transmitting holes 94 (and the interval between the respective LED 98) in advance such that the focused spots are aligned at equal intervals on the photosensitive material 18.

A diffusing plate 102 is fixed on (i.e., to the light emitting side of) the slit plate 90. The light transmitted through the transmitting holes 92 is diffused by the diffusing plate 102 such that the light is made uniform at the light emitting region corresponding to the transmitting holes 92. For example, the fixing portion of the wire to the LED chip 96 creates a shadow with respect to the light from the LEDs 98, and the distribution of the amount of the illuminated light is uneven. However, in this case as well, the unevenness is eliminated by the diffusing plate 102 so that uniform light is obtained within the light-emitting region.

An ND filter 106 surrounded by a filter frame 104 is provided on (i.e., at the light emitting side of) the diffusing plate 102. The ND filter 106 adjusts the light emitted from the LEDs 98 to become an appropriate amount of light on the photosensitive material 18.

The above-described protective frame 86, slit plate 90, diffusing plate 102 and filter frame 104 are fixed to the substrate 82R by screws. Of course, the structure for fixing these members to the substrate 82R is not limited to screws.

Figure 5:
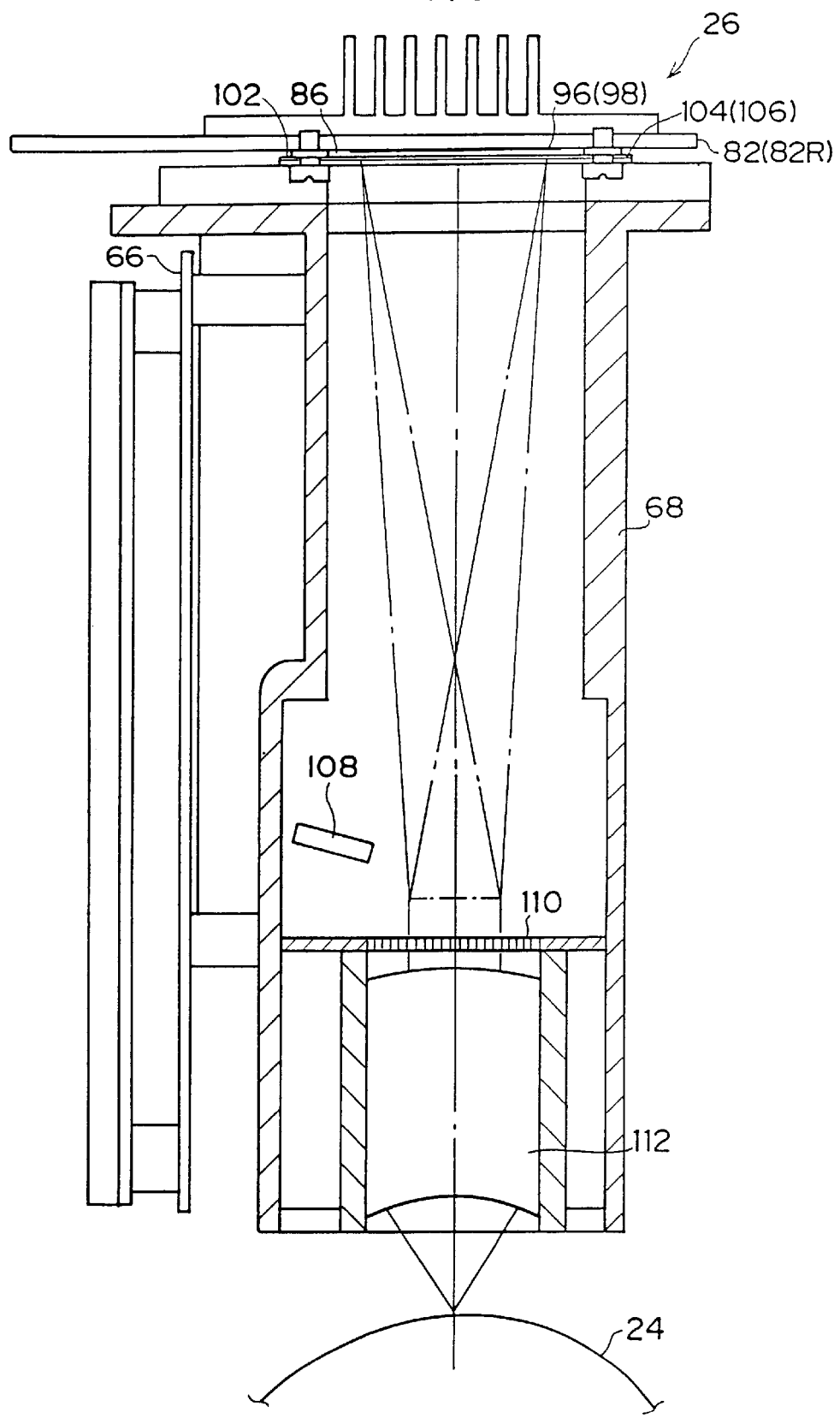
FIG. 5 is a sectional view of the exposure head having the focusing optical system relating to the embodiment of the present invention.

As illustrated in FIG. 5, a light amount sensor 108, a diffraction grating 110 and a focusing lens 112 are provided in that order, within the casing 68, from the substrate 82R toward the exposure drum 24.

The light amount sensor 108 measures the amount of light of the light emitted from the LEDs 98. On the basis of the measurement data, the controller 78 (see FIG. 2) adjusts the dispersion in the light amount of by the plural LEDs 98 and adjusts the increase/decrease in the light amount accompanying changes over time, such that the respective LEDs 98 are controlled to always obtain the desired light amount.

Due to the diffraction grating 110, as will be described in detail later, the respective lights emitted from the LEDs 98 are broadened in the subscanning direction, and unevenness in the distribution of the amount of light caused by minute positional offset (pitch offset) or the like of the transmitting holes 92 is eliminated.

The focusing lens 112 is formed by one or plural lenses and a diaphragm. The focusing lens 112 moves in the direction of the optical axis by a magnification changing motor 114 fixed to the casing 68. The focusing lens 112 gathers the light from the LEDs 98, and focuses the light (the image) on the photosensitive material 18 trained around the exposure drum 24. The focusing magnification (1/k) can be changed by driving the focusing lens 112 in the direction of the optical axis by the magnification changing motor 114.

By providing the diffraction grating 110 in addition to the focusing lens 112, the respective focused spots on the photosensitive material 18 are focused at a magnification which is higher than the focusing magnification (1/k) determined by the focusing lens 112. For example, if the distance (light source length) from one end of the plural LEDs 98 to the other end is L, the spot length L' of the focused spot focused on the photosensitive material 18 is:

$$L' = \frac{1}{k} \cdot L \quad (1)$$

For each of the transmitted lights which have been emitted from the respective LEDs 98 and transmitted through the transmitting holes 92, given that the size (the length of a particular portion) of the transmitted light is S and the spot size (the length of the corresponding particular portion) of the focused spot focused on the photosensitive material 18 is S', then the following relationship is established:

$$S' = \frac{1}{k} \cdot S \quad (2)$$

The focusing optical system of the present embodiment is structured so as to include the above-described focusing lens 112 and diffraction grating 110.

Next, operation of the focusing optical system of the present embodiment will be described.

An image signal corresponding to image information is inputted to the controller 78. When the LEDs 98 are lit, due to the transmitting holes 92 formed in the slit plate 90 at predetermined intervals, the lights of the LEDs 98 pass through the slit plate 90 such that the lights from the LEDs 98 are at equal intervals along the subscanning direction on the photosensitive material 18. Further, the lights are made into uniform light in the light-emitting region by the diffusing plate 102. Due to the ND filter 106, the light is made into an amount of light which is appropriate for the photosensitive material 18, and then, the light is incident on the diffraction grating 110.

Figure 6A:
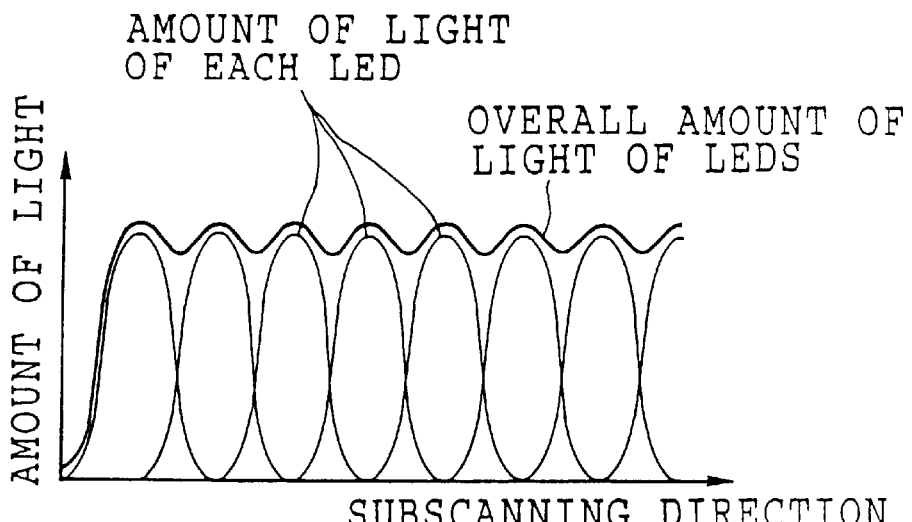
FIG. 6A is a graph qualitatively illustrating a distribution of an amount of light at a focusing optical system which is not provided with diffraction grating, in a case in which the light is at equal intervals in the subscanning direction.
Figure 6B:
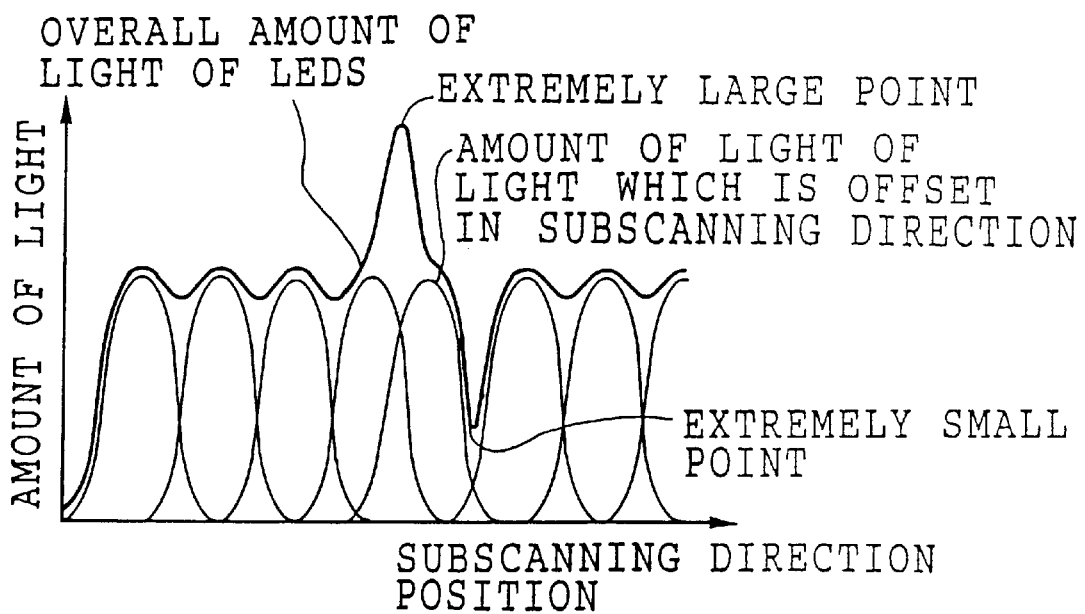
FIG. 6B is a graph qualitatively illustrating a distribution of an amount of light at a focusing optical system which is not provided with diffraction grating, in a case in which a specific light is offset in the subscanning direction.
Figure 7A:
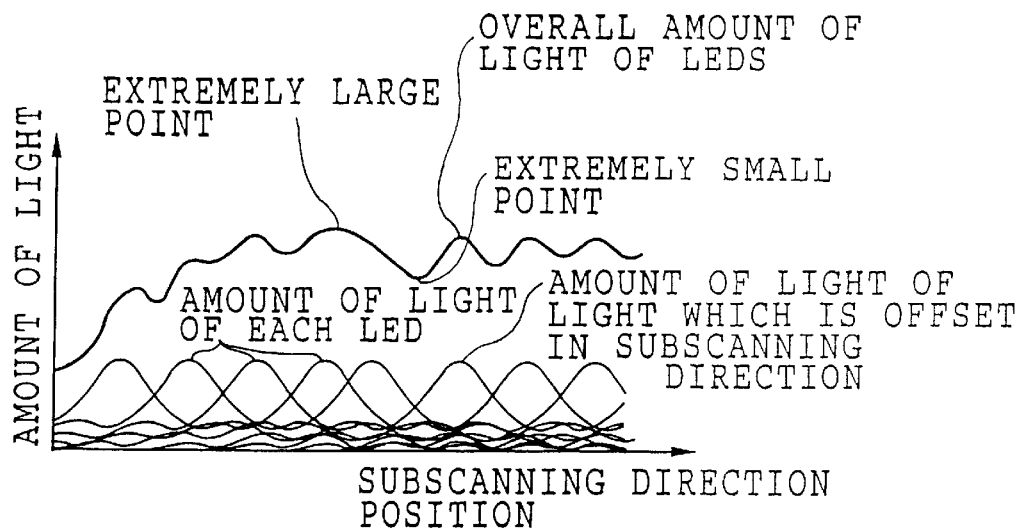
FIG. 7A is a graph qualitatively illustrating, for plural lights, a distribution of an amount of light at the focusing optical system relating to the embodiment of the present invention.

FIGS. 6A and 6B qualitatively illustrates the distribution of the amount of light illuminated from the respective LEDs 98, in a case in which the diffraction grating 110 is not provided. FIG. 7A qualitatively illustrates the distribution of the amount of the light which has passed through the diffraction grating 110.

As can be seen from the graph in FIG. 6A, in a case in which the diffraction grating 110 is not provided, the lights which have passed through the transmitting holes 92 form spot images which are determined by the configuration of the transmitting hole 92 and by the degree of diffusion of the diffusing plate 102 and the like, and there is little spreading of light in the subscanning direction (little spreading of the distribution of the amount of light). Because adjacent lights overlap one another, the distribution of the amount of light in the subscanning direction becomes substantially constant as illustrated by the thick line in FIG. 6A.

Here, let us consider, for example, a case in which, among the plural transmitting holes 92 of the slit plate 90, the position of one particular transmitting hole 92 is offset slightly in the subscanning direction. In this case, as illustrated in FIG. 6B, the beam of light transmitted through the offset transmitting hole 92 is also moved in the subscanning direction. Therefore, the distance between the beam which has passed through that one particular (the offset) transmitting hole 92 and a beam which passes through a transmitting hole 92 adjacent to the one particular (the offset) transmitting hole 92 in the direction of offset (i.e., to the left in this graph) becomes short. Accordingly, a local extremely large point arises in the overall light distribution of the LEDs. Further, the distance between the beam which has passed through the one particular (the offset) transmitting hole 92 and a beam which passes through the transmitting hole 92 adjacent to the one particular (the offset) transmitting hole 92 in the direction opposite the direction of offset increases. Thus, a local extremely small point arises in the overall light distribution of the LEDs. Due to this extremely large point and extremely small point, there is unevenness in the distribution of the amount of light, and the image quality deteriorates.

Figure 7B:
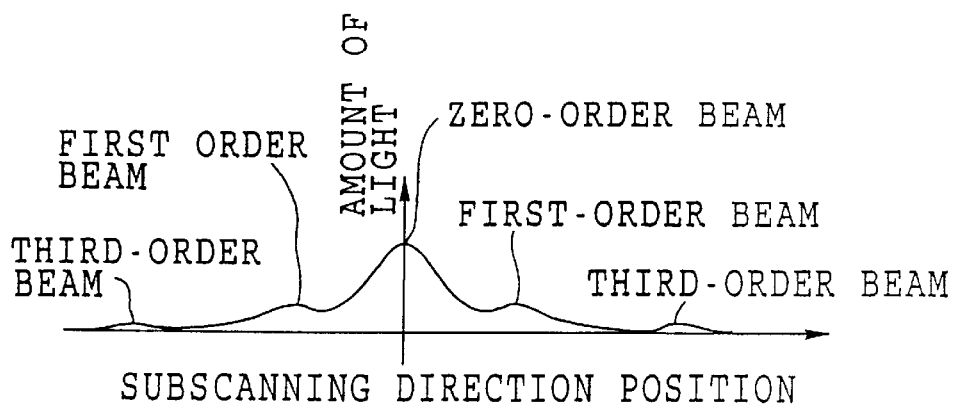
FIG. 7B is a graph qualitatively illustrating, for only a particular light, a distribution of an amount of light at the focusing optical system relating to the embodiment of the present invention.

However, with the focusing optical system of the present embodiment, due to the light which has been transmitted through the transmitting holes 92 passing through the diffraction grating 110, as illustrated in FIG. 7B, in addition to the inherent zero-order beam, a first-order beam, and successively higher-order beams are generated. In other words, as shown by above formula (2), the spot size S' of the focused spot is enlarged at a magnification that actually is higher than the focusing magnification (1/k) determined by the focusing lens 112, and the spot size S' spreads in the subscanning direction. Further, as shown in FIG. 7A, the amounts of light at particular positions in the subscanning direction are respectively an accumulation of light which has passed through plural transmitting holes 92. Accordingly, even in a case in which the position of one particular transmitting hole 92 of the slit plate 90 is offset slightly in the subscanning direction, as shown by the thick line in FIG. 7A, it is difficult for the overall distribution of the amount of light of the LEDs to be affected by this offset, and the fluctuations in the amount of light at the local extremely large point and extremely small point are small. Namely, the unevenness in the distribution of the amount of light, which unevenness is caused by the extremely large point and the extremely small point, is decreased, and a deterioration in the image quality can be prevented.

It is possible for the direction in which the light spreads due to the diffraction grating 110 to be not only the subscanning direction as described above, but to also include a main scanning direction component. The offset of the focused spot in the main scanning direction is eliminated by the exposure drum 24 being main-scanned. However, taking into consideration the precision of the focused image, the precision usually improves if the focused spot is small. Therefore, it is preferable to use a diffraction grating 110 in which the light spreads only in the subscanning direction and does not spread in the main scanning direction.

As described above, in the focusing optical system of the present embodiment, the spot size of the focused spot in the subscanning direction actually is larger than the focused spot size due to the focusing magnification of the focusing lens 112, and the focused spot spreads in the subscanning direction. Therefore, unevenness in the distribution of the amount of light due to variation of the position of the LED 98 can be eliminated, and the image can be focused with high precision.

The spot size enlarging device, which makes the subscanning direction spot size of the focused spot actually larger than the focused spot size due to focusing magnification of the focusing lens 112, is not limited to the diffraction grating 110. For example, instead of the diffraction grating 110, a material exhibiting birefringence (a so-called material having a birefringent property) may be used. Namely, due to the birefringence, in addition to the regular light beam, an abnormal light beam appears, and thus, the focusing size is increased in the direction in which this abnormal light beam spreads. Accordingly, it is preferable to arrange the structure while taking into consideration the direction of the material having a birefringent property, such that the direction in which the abnormal light beam appears is the subscanning direction. Specific examples of materials exhibiting birefringence are fluorite, quartz, calcite and the like.

Further, in place of the diffraction grating 110, another diffusing plate, which is different from the diffusing plate 102, may be provided. In this case as well, a diffusing plate of the type which diffuses light only in the subscanning direction is preferable. In general, the degree of diffusion of the diffusing plate differs in accordance with the wavelength of the light; the longer the wavelength, the smaller the degree of diffusion. Accordingly, a diffusion plate per color may be provided, and the degrees of diffusion of the diffusing plates may be set such that, the longer the wavelength of the corresponding light, the higher the degree of diffusion of the diffusing plate. In this way, the size of the focused beam on the photosensitive material 18 (in particular, the size in the subscanning direction) can be made uniform.

The subscanning direction spot size of the focused spot may be made greater than the focussed spot size due to the focusing magnification of the focusing lens 112 by utilizing the spherical aberration of the focusing lens 112 without using the diffraction grating 110, a material having 2 abirefringent property or a diffusing plate. Namely, a lens usually inherently has spherical aberration. Rather than correcting this spherical aberration, conversely, the spherical aberration may be actively utilized. For example, by using a condenser lens or the like, the spherical aberration can be further increased. In this way, by using the spherical aberration of the focusing lens 112 itself, there is no need to provide another member such as the diffraction grating 110 or the like. Therefore, the number of parts forming the focusing optical system decreases, making the focusing optical system light-weight and inexpensive.

Further, a plurality of the above-described spot size enlarging device may be used in combination.

Figure 8:
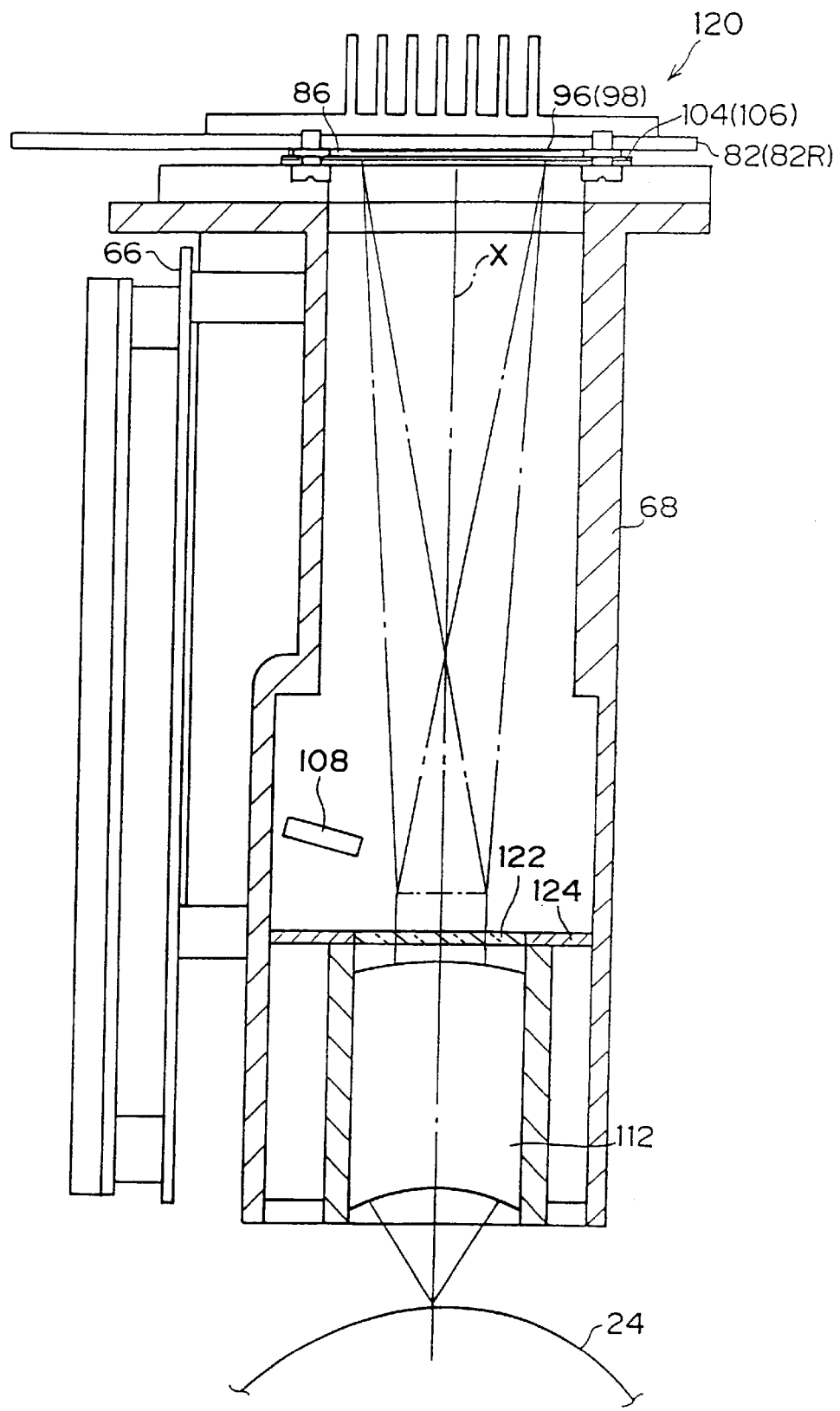
FIG. 8 is a cross-sectional view of an exposure head having a focusing optical system relating to a second embodiment of the present invention.

In FIG. 8, an exposure head 120 having a focusing optical system relating to the second embodiment of the present invention is shown. The second embodiment differs from the first embodiment only in the structure of the exposure head 120. Other structures of the first embodiment and the second embodiment are the same. Accordingly, a description will be provided for only the exposure head 120. Further, structural elements, members and the like that are the same as those of the first embodiment are indicated by the same reference numerals, and description thereof will be omitted.

In the exposure head 120 in the second embodiment, a diffusing plate 122 for diffusing light is provided instead of the diffraction grating 110 in the first embodiment (see FIG. 5). The diffusing plate 122 is held at a holding plate 124, and is disposed at a pupil position of the focusing lens 112 or vicinity thereof.

In the exposure head 120 in the second embodiment, the diffusing plate 122 diffuses light in the same way as does the diffusing plate 102 in the first embodiment. As a result, light transmitted through the transmitting holes 92 (refer to FIG. 3) is made uniform within the light-emitting region corresponding to the transmitting holes 92. Namely, even in cases in which distribution of the amount of the illuminated light is uneven, the unevenness is eliminated by the diffusing plate 122, and uniform light can be obtained within the light-emitting region.

Further, the diffusing plate 122 diffuses light at the pupil position of the focusing lens 112 or vicinity thereof. Accordingly, light is focused at a spot magnification that is greater than the focusing magnification of the focusing lens 112, and the light in the focus position substantially widens. As a result, in the same way as in the diffraction grating 110 of the first embodiment, unevenness in the distribution of the amount of the illuminated light, which is caused by minute positional offset (pitch offset) or the like of the transmitting holes, is eliminated.

In this way, in the second embodiment, the diffusing plate 122 is provided at the pupil position of the focusing lens 112 or vicinity thereof. As a result, eliminating unevenness in the distribution of the amount of the illuminated light (what is known as beam shaping) and increasing the spot size can be carried out with a single member. As a result, in comparison with a case in which members each providing one of these operations are provided separately, the number of components and the weight of the exposure head 120 can be reduced. Accordingly, manufacturing costs can also be reduced. For example, in the example shown in FIG. 8, there is no need to provide the diffusing plate 102 of the first embodiment.

Figure 9:
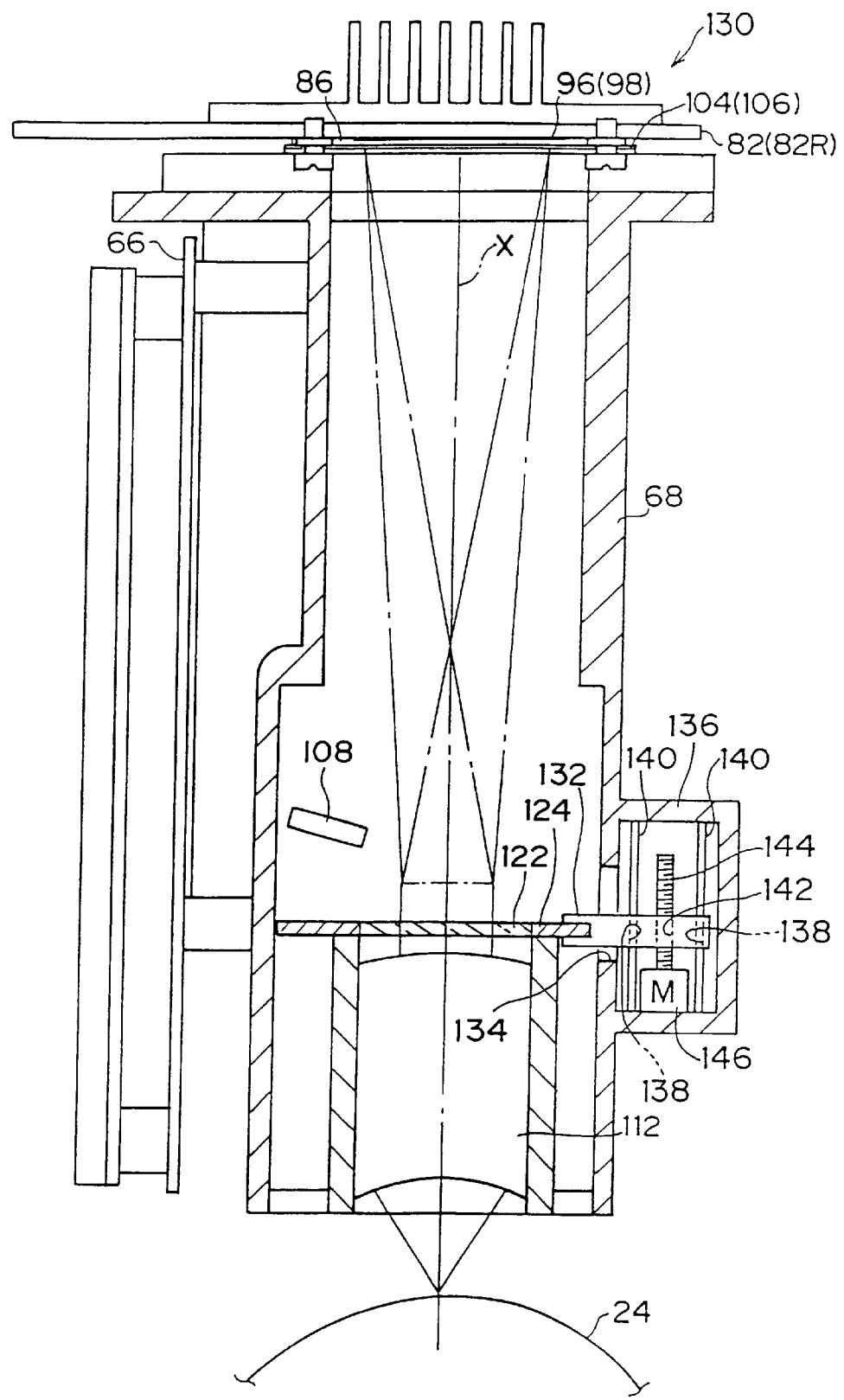
FIG. 9 is cross-sectional view of an exposure head having a focusing optical system relating to a third embodiment of the present invention.

In FIG. 9, an exposure head 130 in a third embodiment of the present invention is shown. The third embodiment differs from the second embodiment only in the structure of the exposure head 130. Other structures of the first embodiment and the second embodiment are the same. Accordingly, a description will be provided for only the exposure head 130. Further, structural elements, members and the like that are the same as those of the first and second embodiment are indicated by the same reference numerals, and description thereof will be omitted.

In the exposure head 130 in the third embodiment, the same diffusing plate 122 as in the second embodiment is held at the holding plate 124. Further, the holding plate 124 is held at a diffusing plate holder 132. The diffusing plate holder 132 passes through a moving hole 134 formed in a casing 68, and protrudes into a box for moving 136, which is provided in the casing 68. A passage hole 138 is formed in a protruding portion of the diffusing plate holder 132, and a guide shaft 140 is inserted into the passage hole 138 so as to pass therethrough. Accordingly, the diffusing plate holder 132 is movable in the direction of the optical axis. Further, a female screw 142 is formed in the protruding portion of the diffusing plate holder 132. A male screw 144, which is screwed into the female screw 142, is rotated by a motor 146. Accordingly, when the motor 146 rotates, the diffusing plate holder 132 moves in the optical axis direction along the guide shaft 140, and the diffusing plate 122 also moves in the optical axis direction. Thus, the spot magnification, which depends on the diffusing plate 122, can be changed. At this time, the diffusing plate holder 132 is guided along the guide shaft 140, and so the diffusing plate 122 can constantly maintain an orthogonal state with respect to the optical axis X.

Further, the box for moving 136 completely covers the moving hole 134, which prevents unnecessary light from entering into the exposure head 130.

In the same way as in the exposure head 120 in the second embodiment, with the exposure head 130 in the third embodiment structured in this way, the diffusing plate 122 can be provided at the pupil position of the focusing lens 112 or vicinity thereof. Accordingly, eliminating unevenness in the distribution of the amount of the illuminated light (what is known as beam shaping) and increasing the spot size is made possible.

In addition, in the third embodiment, by rotating the motor 146 and moving the diffusing plate 122 in the optical axis direction, the spot magnification, which depends on the diffusing plate 122, can be changed. Accordingly, the spot size (focusing beam diameter) of the spots focused with the focusing lens 112 can be made to be a desired diameter. As a result, unevenness in the distribution of the amount of the illuminated light caused by minute positional offset (pitch offset) of the transmitting holes 92 can be effectively corrected, so that focusing can be carried out with greater accuracy.

Further, in the third embodiment, an operator can manually execute rotation of the motor 146 to adjust the position of the diffusing plate 122. However, it is also possible to automate the position adjustment by connecting the motor 146 to a controlling device such as the controller 78 or the like.

Also, it is possible to make the adjusting device (for the position of the diffusion plate) removable from the exposure head. In this case, after adjustment of the position of the diffusing plate 122, it is possible that the diffusing plate 122 is fixed, for example, by adhesive, to the exposure head, and the adjusting device is removed. Due to removal of the adjusting device from the exposure head, the exposure head can be made lightweight, therefore, the main scanning can be carried out in a stable manner.

Figure 10:
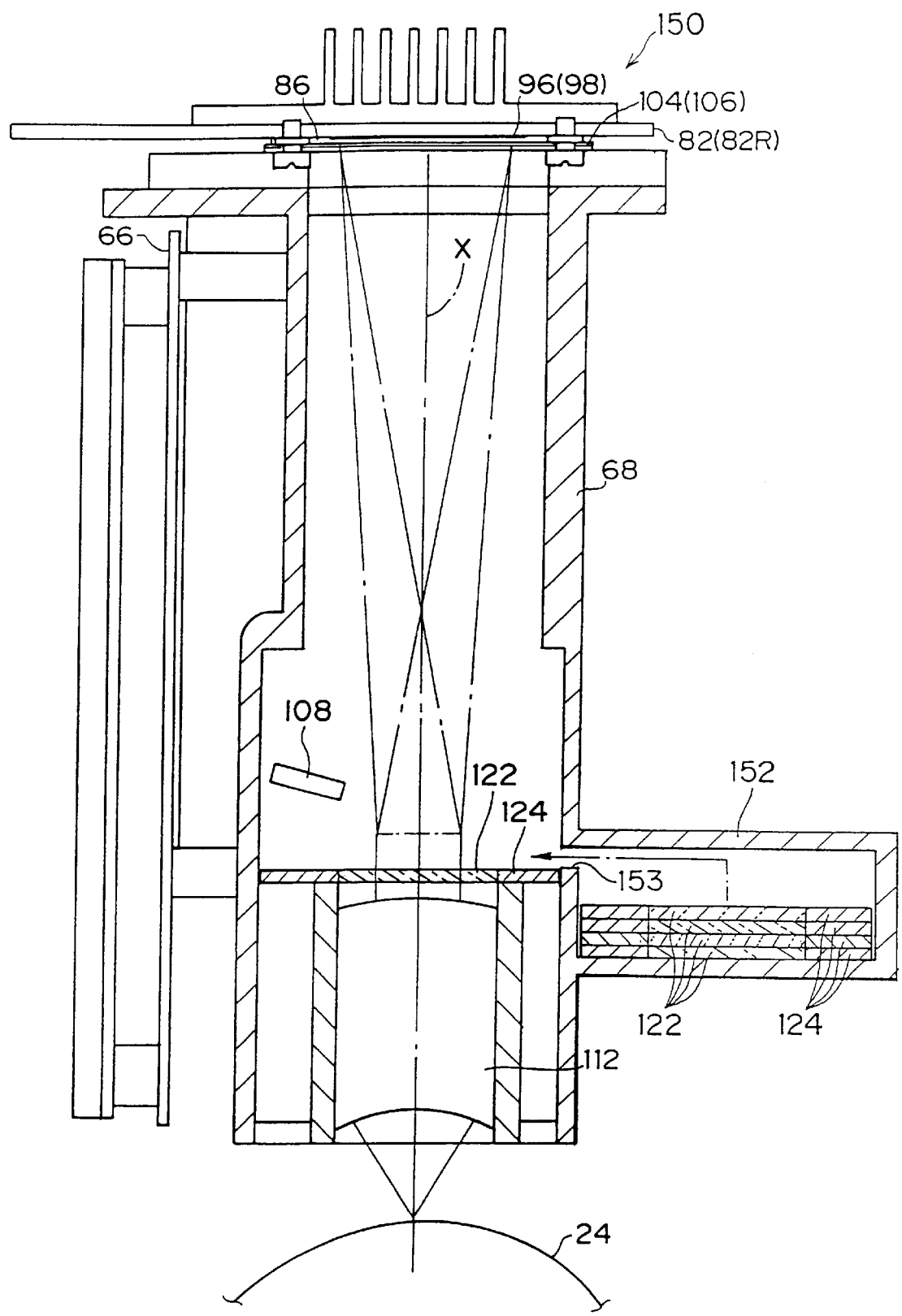
FIG. 10 is cross-sectional view of an exposure head having a focusing optical system relating to a fourth embodiment of the present invention.

In FIG. 10, an exposure head 150 in a fourth embodiment of the present invention is shown. The fourth embodiment differs from the second embodiment only in the structure of the exposure head 150. Other structures of the fourth embodiment and the second embodiment are the same. Accordingly, a description will be provided for only the exposure head 150. Further, structural elements, members and the like that are the same as those of the first to third embodiments are indicated by the same reference numerals, and description thereof will be omitted.

In the exposure head 150 in the fourth embodiment, each of a plurality of diffusing plates 122 is prepared in a state of being held in a holding plate 124. Each of the plurality of the diffusing plates 122 is accommodated within a diffusing plate accommodation box 152. One or a plurality of desired diffusing plates 122 is chosen from this diffusing plate accommodation box 152. The chosen (desired) diffusing plate(s) 122 may be disposed at the pupil position of the focusing lens 112 or vicinity thereof via a hole for disposing 153, which hole is in the casing 68. The chosen diffusing plate(s) 122 can also be returned to inside the diffusing plate accommodation box 152, or the like. The structure for moving the chosen diffusing plate(s) 122 to and from the pupil position of the focusing lens 122 or vicinity thereof is not particularly limited. It is possible to provide, for example, a structure provided with a gripping member for gripping the diffusing plate(s) 122 (for example, a gripping arm or the like). With such a structure, the gripping member grips the diffusing plate(s) 122 to dispose the diffusing plate(s) 122 at the pupil position or vicinity thereof or to return the diffusing plate(s) 122 disposed at the pupil position or vicinity thereof back to the diffusing plate accommodation box 152.

Further, the degree of diffusion of each of the plurality of the diffusing plates 122 may be same, or different from each other.

In the same way as in the box for moving 136 of the third embodiment, the hole for disposing 153 is completely covered with the diffusing plate accommodation box 152 in the fourth embodiment such that unnecessary light does not enter into the exposure head 130.

In the exposure head 150 of the fourth embodiment structured in this manner, the diffusing plate 122 is disposed at the pupil position of the focusing lens 112 or vicinity thereof, in the same way as in the exposure head 120 in the second embodiment and the exposure head 130 in the third embodiment. Accordingly, eliminating unevenness in the distribution of the amount of the illuminated light (what is known as beam shaping) and increasing the spot size is made possible.

In addition, in the fourth embodiment, by arbitrarily choosing the diffusing plate(s) 122 and disposing it (them) at the pupil position of the focusing lens 112 or vicinity thereof, the degree of diffusion of the entire diffusing plate(s) 122 disposed at this position can be substantially changed. Since the spot magnification can be changed by changing the degree of diffusion to a desired degree of diffusion in this way, the spot size (focusing beam diameter) of the spot focused by the focusing lens 112 can be made to be a desired diameter. As a result, unevenness in the distribution of the amount of illuminated light originating in minute positional offset (pitch offset) of the transmitting holes 92 or the like can be effectively corrected. Further, focusing can be carried out with greater accuracy. So long as a desired spot magnification can be obtained in this way, the number of the diffusing plates 122 disposed at the pupil position or vicinity thereof is not particularly limited, and may be one or more.

Further, in the fourth embodiment, the operator can carry out manual operations to dispose the diffusing plate 122 at the pupil position or vicinity thereof or return the diffusing plate to the diffusing plate accommodation box 152 by operating the gripping member. However, it is also possible to automate the position adjustment of the diffusion plate by connecting the motor 146 to a controlling device such as the controller 78 or the like.

Also, it is possible to make the diffusing plate accommodation box removable. In this case, after the spot size (focusing beam diameter) of the spot focused by the focusing lens is made to be a desired diameter, it is possible that the diffusing plate accommodation box is removed. Due to removal of the diffusing plate accommodation, the exposure head can be made lightweight, therefore, the main scanning can be carried out in a stable manner.

Figure 11:
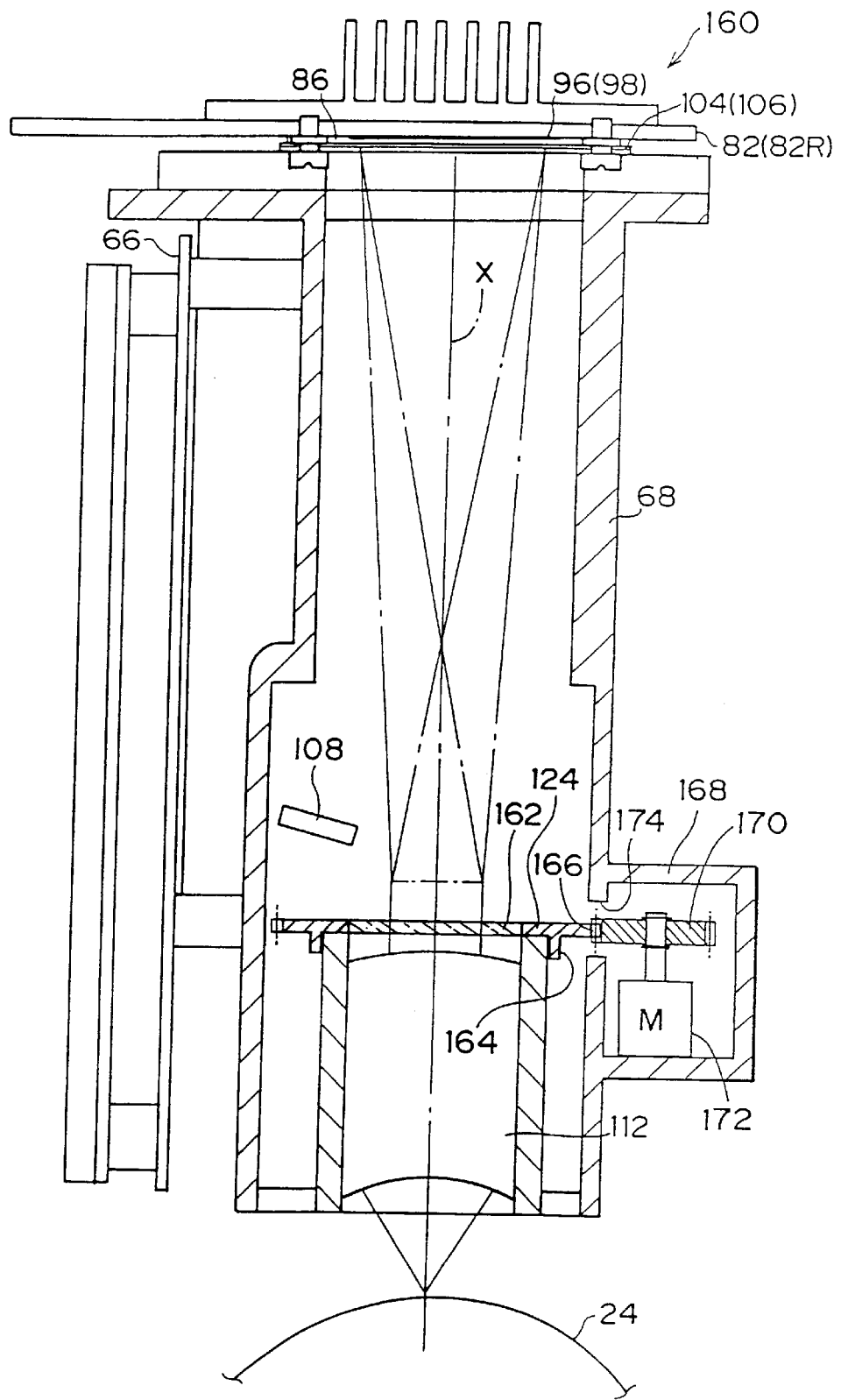
FIG. 11 is a cross-sectional view of an exposure head having a focusing optical system relating to a fifth embodiment of the present invention.

In FIG. 11, an exposure head 160 in a fifth embodiment of the present invention is shown. The fifth embodiment differs from the second embodiment only in the structure of the exposure head 160. Other structures of the fifth embodiment and the second embodiment are the same. Accordingly, a description will be provided for only the exposure head 160. Further, structural elements, members and the like that are the same as those of the first to fourth embodiments are indicated by the same reference numerals, and description thereof will be omitted.

Figure 12:
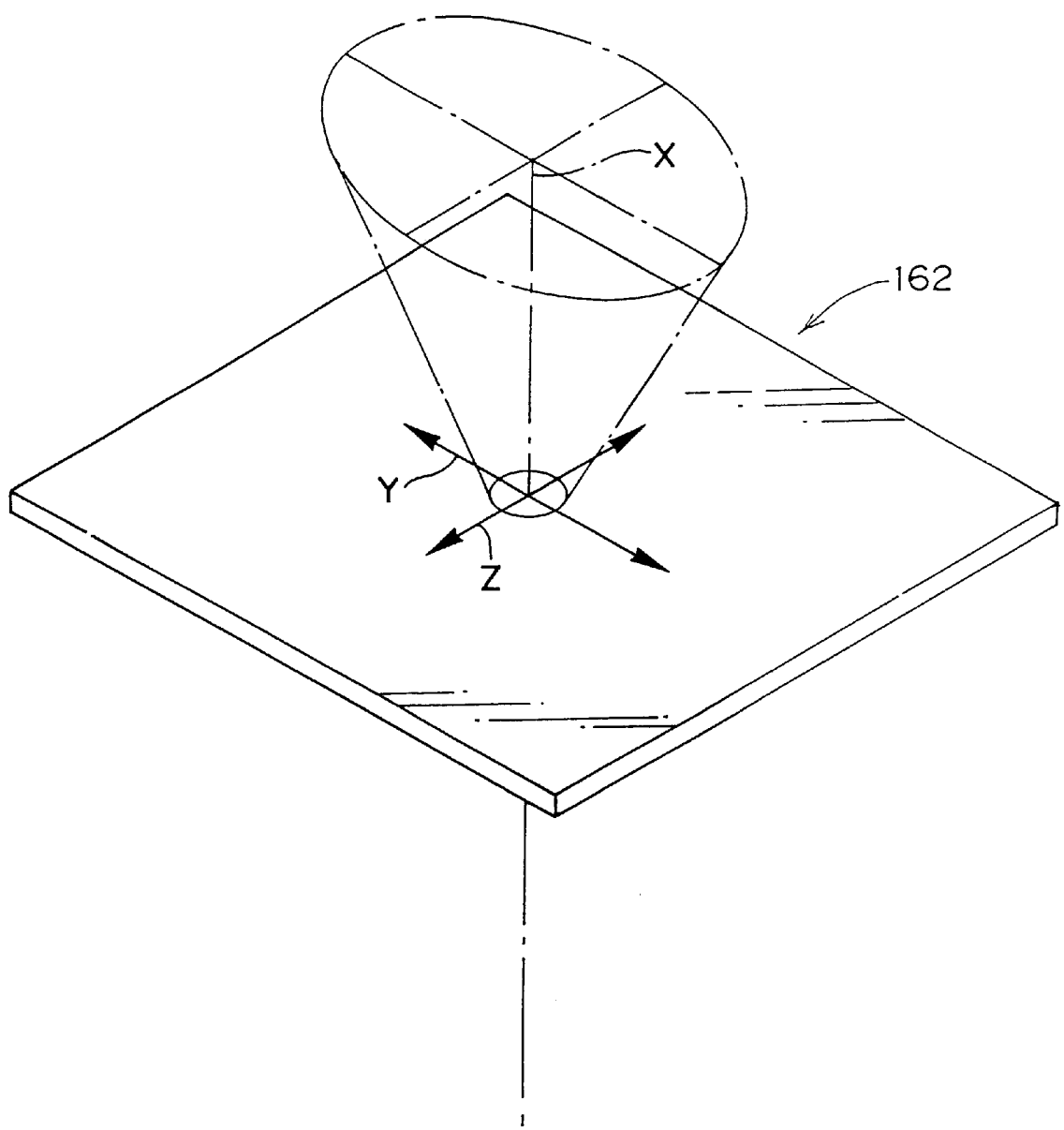
FIG. 12 is a perspective view showing a diffusing plate used in the focusing optical system relating to the fifth embodiment of the present invention.

In the fifth embodiment, a diffusing plate 162 having a degree of diffusion that differs in accordance with direction is used. Namely, as shown in FIG. 12, with this diffusing plate 162,-the degree of diffusion in the directions of arrow Y along the surface of the diffusing plate 162 is the highest (i.e., the light is most easily diffused in the direction of arrow Y). The degree of diffusion in the directions orthogonal to the directions of arrow Y (i.e., the directions of arrow Z) is the lowest. The degree of diffusion continuously decreases in the directions moving from the direction of arrow Y to the directions of arrow Z rotating around the optical X.

Holding tubes 164 each shaped in a short cylinder form are formed at the holding plate 124 for holding the diffusing plate 162. The holding tubes 164 contact outer peripheral surface of the focusing lens 112, and hold the diffusing plate 162 such that rotation of the diffusing plate 162 is possible about the optical axis X. Further, at a periphery of the holding member 124, outer teeth 166 are formed, a portion of which protrudes from a hole for meshing 174, formed at the casing 68.

A gear containing box 168 is provided at the casing 68. Inside the gear containing box 168, an external gear 170 is formed, which is rotated by a motor 172. The external gear 170 and the outer teeth 166 of the holding plate 124 are constantly meshed with each other. When the external gear 170 rotates, the holding plate 124 rotates, and the diffusing plate 162 rotates with the optical axis X as a center. Then, due to rotation of the diffusing plate 162, degree of diffusion in the direction in which the LEDs 98 are aligned (see FIGS. 3 and 4, subscanning direction) and in the direction orthogonal thereto (main scanning direction) changes, and a desired spot magnification can be obtained.

Further, in the same way as in the box for moving 136 in the third embodiment, the hole for meshing 174 is completely covered with the gear containing box 168 of the fifth embodiment, so that unnecessary light does not enter into the exposure head 160.

In the exposure head 160 in the fifth embodiment structured in this manner, the diffusing plate 162 is disposed at the pupil position of the focusing lens 112 or vicinity thereof, in the same way as in the exposure head 120 in the second embodiment, the exposure head 130 in the third embodiment, and the exposure head 150 in the fourth embodiment. Accordingly, eliminating unevenness in the distribution of the amount of the illuminated light (what is known as beam shaping) and increasing the spot size is made possible.

In addition, in the fifth embodiment, by rotating the holding plate 124 in the optical axis direction, the spot magnification, which depends on the diffusing plate 122, can be changed. Accordingly, the spot size (focusing beam diameter) of the spots focused with the focusing lens 112 can be made to be a desired diameter. As a result, unevenness in the distribution of the amount of the illuminated light caused by minute positional offset (pitch offset) of the transmitting holes 92 can be effectively corrected, so that focusing can be carried out with greater accuracy.

Further, in the fifth embodiment, the operator may manually execute rotation of the motor 172 in order to adjust the position of the diffusing plate 162. However, it is also possible to automate the angle adjustment of the diffusing plate 162 by connecting the motor 172 to a controlling device such as the controller 78 or the like.

The diffusing plate 162 is not necessarily rotated about the optical axis X as a center, and for example, may be rotated about an axis that is parallel with the optical axis X, or about an axis that is at an inclined angle with respect to the optical axis X.

Also, it is possible to make the adjusting device (for adjusting rotational angle of the diffusion plate) removable. In this case, after adjustment, it is possible that the diffusing plate 122 is fixed and the adjusting device is removed. Due to removal of the adjusting device, the exposure head can be made lightweight, therefore, the main scanning can be carried out in a stable manner.

As described above, the exposure head of the second to the fifth embodiments is provided with the diffusing plate 122 or 162 at the pupil position of the focusing lens 112 or vicinity thereof. Accordingly, eliminating unevenness in the distribution of the amount of the illuminated light (beam shaping) and increasing the spot size is made possible. Moreover, reducing the number of components and the weight of the exposure head is possible. Manufacturing costs can also be lowered.

In addition, in the exposure head in the third to the fifth embodiments, the spot magnification of the spots can be changed by the diffusing plates 122, 162 to have the spot size (focusing beam diameter) be a desired diameter. Accordingly, unevenness in the distribution of the light amount can be effectively corrected, and focusing can be carried out with higher accuracy.

Further, so long as the spot magnification can be changed in this manner, the specific structure is not limited to those described above. For example, the diffusing plates 122, 162 may be formed with a material whose scattering degree (degree of diffusion) can be changed, in order to adopt a structure in which the scattering degree of the diffusing plate itself can be changed. For example, as the diffusing plates 122, 162, a diffusing plate formed with a crystal having light scattering properties whose scattering degree changes in accordance with the applied voltage. By adopting such a structure, the scattering degree can be changed simply by changing the applied voltage. Thus, adopting a structure in which the spot size can be changed is made simple.

In the diffusing plate used in the exposure head in the second to the fourth embodiments, the orientation of the degree of diffusion in the direction along the surface of the diffusing plate 122 (namely, the direction orthogonal to the optical axis X) is not particularly limited. However, a diffusing plate having a different degree of diffusion in two different directions along the surface thereof can be used. Using this kind of diffusing plate is preferable since the spot magnification can be changed to a desired spot magnification that differs in accordance with the direction, and desirable beam shaping can be carried out, and the like. For example, in the same way as in the diffusing plate 162 of the fifth embodiment, a diffusing plate in which the degree of diffusion in two orthogonal directions along the surface are different from each other can be used. In this case, if the diffusing plate is disposed such that the spot magnification in the subscanning direction is larger than the spot magnification in the main scanning direction, the spot size is larger in the subscanning direction than the main scanning direction, and unevenness in the distribution of the amount of light can be reduced. Further, since the spot size is smaller in the main scanning direction than in the subscanning direction, a more distinct image can be obtained.

Similarly, in the fifth embodiment, by adjusting the angle of the diffusing plate 162 and adjusting the rotational angle of the diffusing plate 162 such that the spot magnification in the subscanning direction is larger than the spot magnification in the main scanning direction, unevenness in the distribution of the light amount can be reduced, and a more distinct image can be obtained.

Further, in the second to the fifth embodiments, the position for disposing the diffusing plates 122, 162 need only be at the pupil position of the focusing device (focusing lens 112) or vicinity thereof. The specific position is appropriately determined in accordance with the desired spot magnification and the like. Namely, as described for the third embodiment, the spot magnification is changed by moving the position of the diffusing plates 122, 162 in the optical axis direction. Accordingly, so long as a position of the diffusing plate 122, 162 is within a range in which the desired spot magnification can be obtained, the position is included within "the pupil position of the focusing device or vicinity thereof" in the present invention.

Also, ground glass, opal glass, non-glare plate, resin diffusion plate, beam shaping diffuser, liquid crystal and the like is used as the diffusion plate in the embodiments.

What is claimed is:

1. A focusing optical system, comprising:
   a plurality of light sources emitting light in accordance with image information;
   a focusing device for focusing-light from the plurality of light sources such that intervals between light from the plurality of light sources is at a predetermined focusing magnification with respect to intervals between the plurality of light sources; and
   a spot size enlarging device for focusing focused spots of the plurality of light sources at a spot magnification which is larger than the focusing magnification by the focusing device.

2. A focusing optical system according to claim 1, wherein the spot size enlarging device comprises at least one diffraction grating.

3. A focusing optical system according to claim 1, wherein the spot size enlarging device comprises at least one material having a birefringent property.

4. A focusing optical system according to claim 1, wherein the spot size enlarging device is at least one lens forming the focusing device and has a predetermined spherical aberration.

5. A focusing optical system according to claim 1, wherein at least one diffusing member, which diffuses the light from the plurality of light sources, is disposed between the plurality of light sources and the focusing device.

6. A focusing optical system according to claim 5, wherein the plurality of light sources is formed with at least two types of light sources, each of different wavelengths, and the diffusing member has a degree of diffusion corresponding to the different wavelengths of the plurality of light sources.

7. A focusing optical system according to claim 1, wherein the spot magnification of the spot size enlarging device is set to be greater in a subscanning direction than in a main scanning direction.

8. A focusing optical system according to claim 1, wherein at least one slit plate in which light-pass-through holes corresponding to the light from the plurality of light sources are formed, is disposed between the plurality of light sources and the focusing device.

9. A focusing optical system according to claim 8, wherein auxiliary light-pass-through holes are formed in the slit plate, at positions corresponding to positions of outer sides of light sources which are provided at both end portions of said plurality of light sources in the direction in which the plurality of light sources are aligned.

10. A focusing optical system according to claim 9, wherein dummy light sources are provided at positions corresponding to positions of said auxiliary light-pass-through holes.

11. A focusing optical system according to claim 1, wherein the plurality of light sources are arranged along a subscanning direction, and the spot magnification of the post size enlarging device is set to be greater in a subscanning direction than in a main scanning direction.

12. A focusing optical system, comprising:

a plurality of light sources emitting light in accordance with image information;

a focusing device for focusing light from the plurality of light sources such that intervals between light from the plurality of light sources is at a predetermined focusing magnification with respect to intervals between the plurality of light sources; and a diffusing device provided at one of a pupil position of the focusing device or a vicinity thereof, for diffusing light from the plurality of light sources.

13. A focusing optical system according to claim 12, wherein the diffusing device has different degrees of diffusion in two directions orthogonal to an optical axis of the plurality of light sources.

14. A focusing optical system according to claim 13, wherein the degree of diffusion of the diffusing device is larger in a subscanning direction than in a main scanning direction.

15. A focusing optical system according to claim 12, wherein the diffusing device is movable in a direction of the optical axis.

16. A focusing optical system according to claim 12, wherein the diffusing device comprises a plurality of diffusing plates disposed at one of the pupil position of the focusing device or the vicinity thereof such that the plurality of diffusing plates are removable from the pupil position.

17. A focusing optical system according to claim 12, wherein the diffusing device is rotatable at one of the pupil position or the vicinity thereof.

18. A focusing optical system according to claim 12, wherein the diffusing device is formed with a material whose degree of diffusion is changeable.

19. A focusing optical system according to claim 18, wherein the diffusing device is formed with a liquid crystal having light scattering properties, whose scattering degree changes due to voltage applied thereto.

20. A focusing optical system, comprising:

at least two light sources which emit light in accordance with image information;

a focusing device for focusing light emitted from the at least two light sources on a photosensitive material on the basis of a predetermined focusing magnification; and a magnification enlarging device for setting a magnification based on an interval between light emitted from the at least two light sources and focused on the photosensitive material to be larger than the predetermined focusing magnification.

* * * * *